R. Dillon.
Cotton Bale Tie.
Nº 62,400. Patented Feb. 26, 1867.
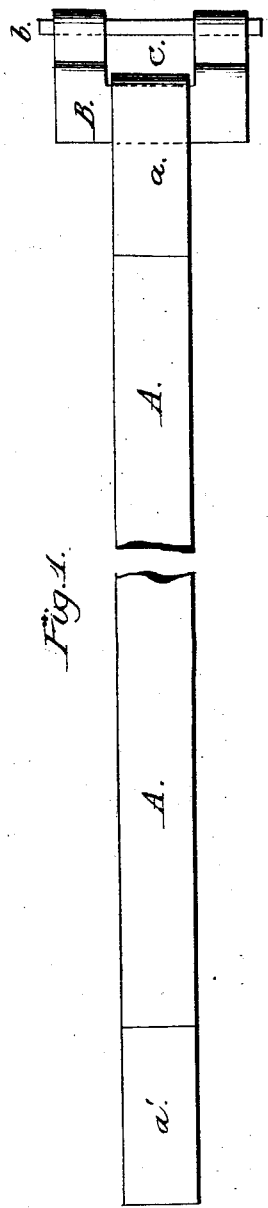
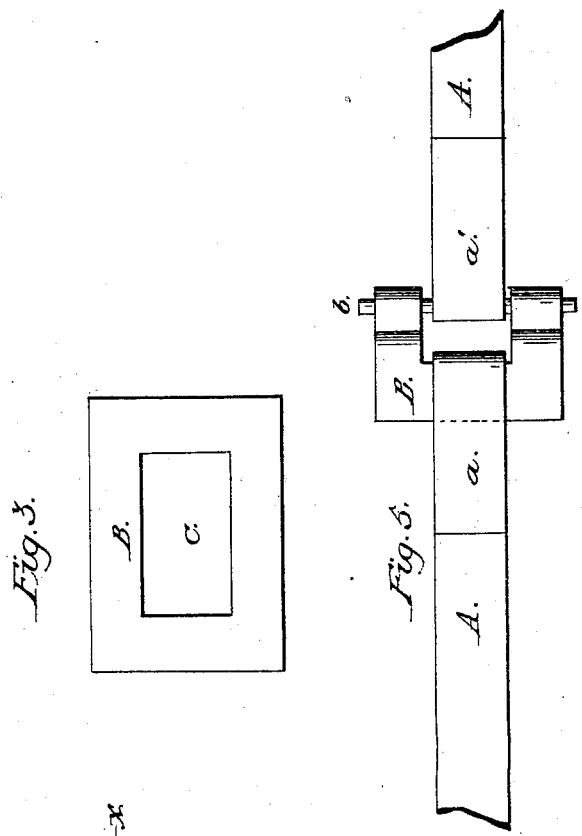
Witnesses:
F. A. Jackson
W. Trevin
Inventor:
Robt. Dillon
Per Munn & Co
attorneys

United States Patent Office.

ROBERT DILLON, OF NEW YORK, N. Y.

*Letters Patent No. 62,400, dated February 26, 1867.*

---

IMPROVEMENT IN BALE-HOOP FASTENING.

---

*The Schedule referred to in these Letters Patent and making part of the same.*

---

TO ALL WHOM IT MAY CONCERN:

Be it known that I, ROBERT DILLON, of the city, county, and State of New York, have invented a new and improved Bale-Hoop Fastening; and I do hereby declare that the following is a full, clear, and exact description thereof, which will enable others skilled in the art to make and use the same, reference being had to the accompanying drawings, forming part of this specification, in which—

Figure 1 represents my improved bale tie on one end of a bale hoop.
Figure 2 is a side view of the main plate, detached.
Figure 3 is a view of the same at one stage of its manufacture, when made of sheet iron.
Figure 4 is a section of the main plate taken in the line $x\ x$, fig. 2.
Figure 5 represents my improved bale tie in connection with both ends of a bale hoop.

Similar letters of reference indicate like parts.

This invention relates to a new and useful improvement in a bale tie or fastening, to secure the ends of iron hoops on cotton and other bales; it consists of a flat metal plate, shaped somewhat like a Roman capital or block letter E, which plate is formed with a main cross-stem or body, having projecting sides or wings; and connected therewith is an iron pin that is inserted through eyes or holes in the ends of the wings. The main stem of the plate holds one end of a bale hoop, and the pin holds the other, and both ends of the hoop are folded and lapped in such a manner that they lie flat and are made fast by the expansion of the bale after it is taken from the press. Iron hoops are, in many respects, superior to rope for baling cotton, but, although apparently a very simple matter, great practical difficulties have attended the fastening of the ends properly. Many ingenious devices have been proposed, but, in one or more particulars, they are all practically defective. My improvement obviates the objections to bale ties hitherto invented, and combines all those practical advantages which long experience in the business of pressing and shipping cotton has shown me they should possess. Dispatch is necessary in baling cotton, especially with the hydraulic press; the bale tie, therefore, should be easily and quickly fastened, and require no extra tools for bending or attaching the hoop. The hoop should be as strong in its connection with the bale tie as at any other part, and the ends should not be cut or twisted, as that makes extra strength and weight in the hoop necessary. With my bale tie the ends of the hoop are folded over square and flat, and the strength is unimpaired, for which reason very light hoop iron may be used at a great saving of cost and charges to the shipper and purchaser of cotton. A bale tie and the ends of the hoops should lie perfectly flat and smooth on the bale, as the least projection above the surface which can snag or catch on the bagging often causes great mischief in stowing cotton in the hold of a ship, where the bales are jammed in as tight as possible by the most powerful screws and levers. My improved bale tie possesses these several important advantages combined, wherein it differs essentially from any other previously invented.

In figs. 1, 2, 4, 5, B represents the main plate of the bale tie, which may be made by bending and folding together the ends of a piece of sheet iron which has been cut, as shown in fig. 3, or it may be made of malleable cast iron. The plate B is formed of a main stem or cross-piece, $d$, and projections or wings, $e\ e$, on both ends of the main stem $d$. In the ends of the wings $e\ e$ are made loops or holes $i\ i$ for receiving an iron pin, $b$, which is inserted in them and runs across the recess or opening C, between the wings $e\ e$. The fastening of the bale tie is made by folding one end of the hoop A squarely over the stem $d$, so as to form a short lap, $a$, that lies flat underneath the hoop, as shown in fig. 1. The other end of the hoop is also folded squarely over to form a flat lap, $a'$, underneath, which lap is made when the hoop is to be fastened on the bale, so that it will just reach the plate B and enter the recess C. In bending the end of the hoop to form the lap $a$, a loop will be made in it through which the pin $b$ is passed to secure it to the wings $e\ e$, as shown in fig. 5. The fastening of the hoops to the bale will then be complete, and when the bale is removed from the press its expansion will draw the ends of the hoop in opposite directions, and bind the laps $a\ a'$ in such a manner that they will be flat and close against the bale, and thus be absolutely secured.

What I claim as new, and desire to secure by Letters Patent, is—

The construction of the plate B with cross-pieces $d$ and wings $e\ e$, in combination with the pin $b$, substantially as and for the purpose described.

ROBERT DILLON.

Witnesses:
 WM. F. MCNAMARA,
 ALEX. F. ROBERTS.